(12) United States Patent
Aemmer

(10) Patent No.: US 6,263,257 B1
(45) Date of Patent: Jul. 17, 2001

(54) METHOD AND DEVICE FOR DETERMINING RELEVANT VARIABLES IN THE PROCESSING OF TEXTILE STRUCTURES

(76) Inventor: Peter F. Aemmer, Baumlisacherstrasse 36, CH-8907 Wettswil (CH)

(*) Notice: Subject to any disclaimer, the term of this patent is extended or adjusted under 35 U.S.C. 154(b) by 893 days.

(21) Appl. No.: 08/517,628

(22) Filed: Aug. 22, 1995

(30) Foreign Application Priority Data

Aug. 22, 1994 (CH) .................................................. 2568/94

(51) Int. Cl.⁷ .................................................. G06G 7/66
(52) U.S. Cl. .................................. 700/139; 700/48; 700/31; 700/150; 700/37; 700/23; 700/47; 700/44; 700/130; 700/140; 700/143; 700/144; 706/44
(58) Field of Search .................................. 700/48, 31, 150, 700/37, 23, 47, 44, 139, 130, 140, 143, 144; 706/23, 25, 903, 906, 44

(56) References Cited

U.S. PATENT DOCUMENTS

| 5,282,261 | 1/1994 | Skeirik | 706/23 |
| 5,285,377 | 2/1994 | Sugasaka et al. | 700/47 |
| 5,414,619 | 5/1995 | Katayama et al. | 700/31 |
| 5,477,444 | 12/1995 | Bhat et al. | 700/48 |
| 5,553,196 * | 9/1996 | Takatori et al. | 395/24 |

FOREIGN PATENT DOCUMENTS

| 0573656 | 12/1993 | (EP) | D03D/51/00 |
| 0604876 | 7/1994 | (EP) | G01N/33/36 |

OTHER PUBLICATIONS

European Search Report of Jan. 11, 1996.

* cited by examiner

*Primary Examiner*—William A. Cuchlinski, Jr.
*Assistant Examiner*—Marc McDieunel

(57) ABSTRACT

A device for the simulation of spinning machines with a view to their optimum economic use and operation. Starting from material properties of a preproduct (1) determined by measurement, as well as from configuration and setting parameters (3) of such a spinning machine, material properties (2) of the intermediate or output products which are being produced, which properties can be determined by measurement, are predicted using a process model describing the behavior of the spinning machine, by a simulation device. The process model on which a method being based is presented by a neural network. The coefficients determining the actual behavior of this neural network area calculated from a set of sample data in a training phase. This sample data and/or from otherwise conclusively predicted properties of the behavior of such a spinning machine.

17 Claims, 10 Drawing Sheets

METHOD AND DEVICE FOR DETERMINING RELEVANT VARIABLES IN THE PROCESSING OF TEXTILE STRUCTURES

FIELD OF THE INVENTION

The present invention relates to a method and a device for predicting properties of products of a textile processing process on the basis of a process model, proceeding from material properties which are relevant to the processing of a specific input product, as well as predicting configuration and setting variables which influence the course of the processing process.

BACKGROUND OF THE INVENTION

European Patent Application No. 93120587.6 (Shofner et al.) discloses a method for the optimum control of textile machines by means of a process model. The method proceeds from the fact that the process model is represented as a system of linear mathematical equations whose coefficients are determined by means of the method of multiple linear regression on the basis of results from trials which are carried out systematically.

One disadvantage of this method consists of the fact that the restrictions which are produced as a result of the presupposition of a system of linear equations as a process model do not satisfy in many ways the practical requirements as to the accuracy of the simulation of a process by means of such a process model. Since the functional relationships between input data, output data and configuration and setting parameters of a process are as a rule not linear, the simulation of a process by means of a linear model yields results which are usable to a certain extent at most in a narrow operating range.

A further disadvantage of this method consists of the fact that the practical implementation of the method of multiple linear regression for determining the coefficients of the equations of a system of linear equations requires a very good mathematical understanding on the part of the person carrying it out, if a model is to be constructed which is as practically suitable as possible in spite of these fundamental restrictions.

It is the object of the invention, as it is characterized in the claims, to produce a method and a device with which, using a process model, reliable predictions about the interactions of input variables, output variables and setting variables can be made possible in the processing of textile structures without the above mentioned disadvantages.

SUMMARY OF THE INVENTION

This object is achieved in that the relationships between the input variables, the output variables and the configuration and setting variables are prescribed by a regular system, generally designated as a neural network, of nonlinear equations which are at least approximately mutually identical.

This object is further achieved in that the coefficients which the structurally defined equations of such a neural network express are determined by means of an algorithm of the so-called "training method", known as "back propagation", for neural networks on the basis of results from trials which are carried out systematically.

This object is further achieved in that a given basic model in the area of the specific experience of a spinning concern can be matched using simple means in such a way that, in the area of this specific experience, it is reproduced exactly.

This object is further achieved in that at least one spinning machine is provided with measuring devices for determining the input variables, with a computer having an input and an output unit for data, with means for the transmission of data and signals between the computer and the measuring devices, with a program memory in the computer having a model structure which represents a neural network and with a data memory having data about the input products, the output products and configuration and setting parameters.

Significant advantages result from this which, for example, consist in the fact that the process model, because of the great adaptability of a neural network to nonlinear properties of a process to be modelled, can be matched over a greater range with good accuracy to the effective behavior of such a process.

A further advantage lies in the fact that, because of the great adaptability of a neural network to nonlinear properties of a process to be modelled, during the determination of the coefficients which are expressed by the equations on which the model is based, no specific mathematical knowledge and/or insights into the mathematical relationships are necessary and the operations which are necessary for this can also be undertaken by personnel who do not have any special mathematical training.

A further advantage resides in the fact that, in this way, not only can predictions be made about closed, that is to say unitary, processing operations such as, for example, a spinning process from which a yarn is produced. Two or more processing operations which take place one after another can equally well be brought together into a combined process model. This is even possible when, during this processing, processes take place which are distinguished by pronounced non-linearities.

BRIEF DESCRIPTION OF THE DRAWINGS

In the following text, the invention is explained in more detail using an example and with reference to the appended figures, in which FIGS. 1 and 2 each show a method schematically, FIGS. 3 and 4 each show schematically a structure of an element for the method.

DETAILED DESCRIPTION

The method according to the invention can be subdivided into two main steps in which, on the one hand, the formation of a prognosis model and, on the other hand, the prognosis using the prognosis model take place.

Figure 1:
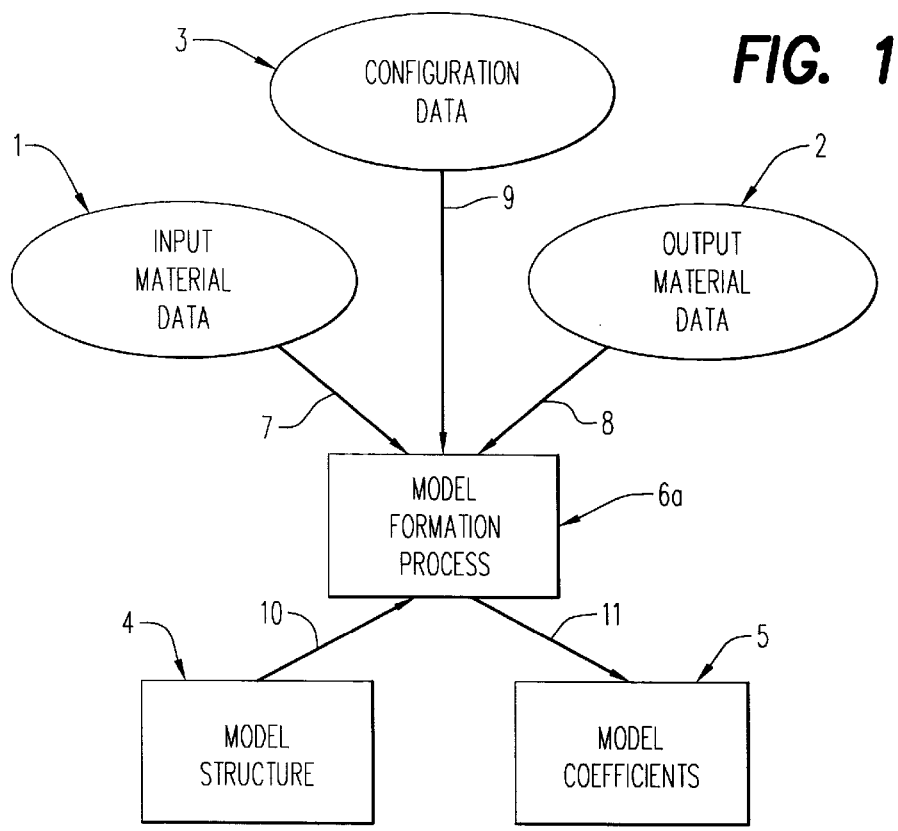

The first main step of the method can be seen from FIG. 1. The initial assumption is that in one area, material data 1 which are acquired by measurement from an input product, material data 2 from an output product and setting or configuration data 3 of a prescribed spinning machine, for example a carding machine or a spinning frame, for processing the input product are present. Also prescribed is a model structure 4 which, together with model coefficients 5, which are still to be determined using a model formation process 6a, yield a usable process model 6.

As input products, for example, fibres, rovings or other products may be mentioned, from which a yarn is intended to be produced. Accordingly, as typical examples of material data 1, mention may be made of the fibre length, the fibre diameter and the type and distribution in terms of quantity of neps and contaminants, etc.

A typical output product can, for example, be a yarn which is specified by means of material data 2 such as its fineness, its uniformity, its breaking strength, the frequency of yarn faults and neps, etc.

As setting data, for example for a spinning frame, the extension of the roving, the rotation of the yarn or the rotational speed of the spindle or of the rotor may be mentioned. As an example of configuration data, the type of equipment of a carding machine with card clothing and cover and the distances relevant in this process may be mentioned, etc.

The model structure 4 is, in turn, determined by the type and the arrangement of basic elements from which the model is constructed. As basic elements, equations come into consideration here which can be realized in terms of hardware by means of arrangements, known per se, having simple logic circuits, operational amplifiers, adders, multipliers, etc. The arrangement of the elements is to be understood as their connection in series, in parallel or combined in many layers, as well as the type and number of the connections between the elements. Such a model structure consists of a system of nonlinear equations which are at least approximately mutually identical, which is generally designated as a neural network.

Coefficients are to be understood as variables or sets of numbers which can be assigned or fed to the equations or elements in the model structure and which influence the behavior of the individual elements and hence of the model. The model structure and the coefficients together form the model or process model.

Hence, the process model is formed in that a model structure 4 is prescribed, material data 1 of the input product, material data 2 of the output product and configuration and setting data 3 of the machine or of the processing are prescribed and in that coefficients are determined which have the effect that a reproducible relationship is produced between data sets of the material data 1 and 2 and the configuration data 3. For this purpose, in the case of given data sets of material and configuration data as starting values, prescribed coefficients are varied until the relationship is true, that is to say given an entry of the material data 1 of the input product and the configuration and setting data 3, the material data 2 of the output product can be output to a good approximation by the process model. The coefficients thus determined are then a fixed component of the process model, are expressed therein in the setting of its elements or are stored in a database, known per se, which can output these as required at any time to the elements. The processes just described are further illustrated by means of arrows 7 to 11, which specify a specific direction for the flow of data and prescriptions. The arrows 7 to 10 are directed towards the model formation process 6a and hence illustrate that material data, configuration and setting data and the model structure for this step are prescribed externally. Usable coefficients are intended to be obtained therefrom, which is illustrated by the direction of the arrow 11, since it points to the result.

Figure 2:
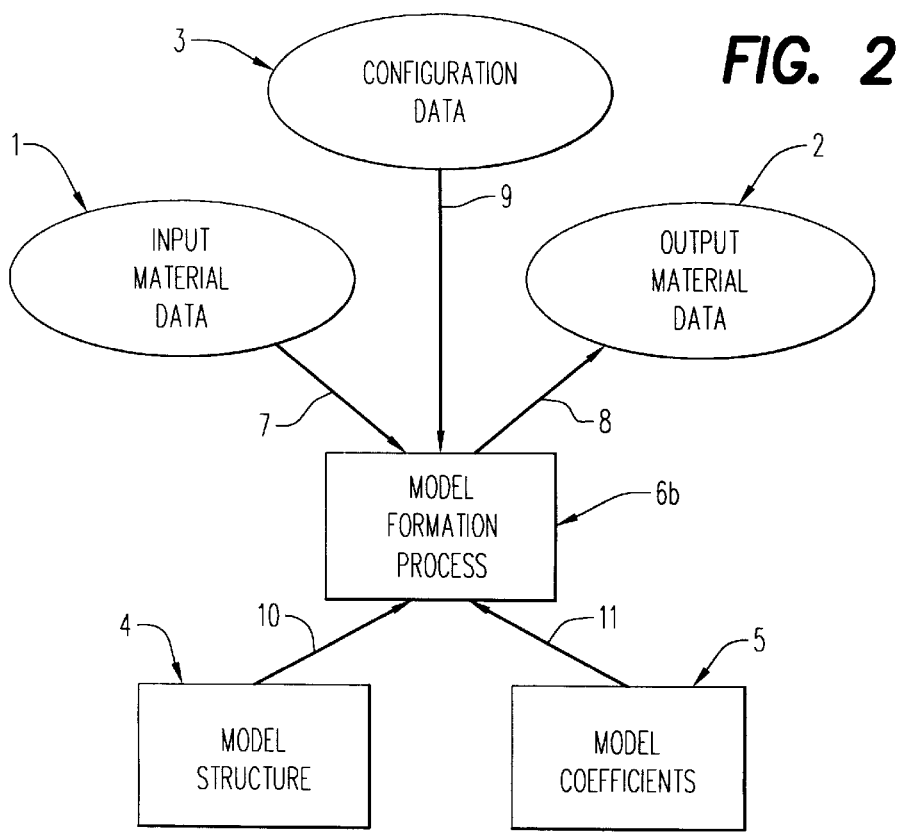

The second main step of the method can be seen from FIG. 2. Herein, elements which are the same and are known from FIG. 1 are provided with the same reference symbols. Arrows 8 and 11 point in the opposite direction and indicate that the coefficients are now known and are hence given and that, for example, material data 2 of output products can be looked for. However, this is only an example, since it is equally conceivable, using this step, to look now for configuration data for known material data 1 and 2, or for material data 1 of the input product from the material data 2 and the configuration and setting data 3, from the known process model. It should be added that the configuration and setting data 3 in this step could likewise be data of a hypothetical processing, that is to say setting data of a machine which does not actually exist. Hence, the mode of operation of such a hypothetical machine could be determined. Relevant data in such cases do not occur as individual data or as individual values but in groups or as data sets which characterize products or machines.

Figure 3:
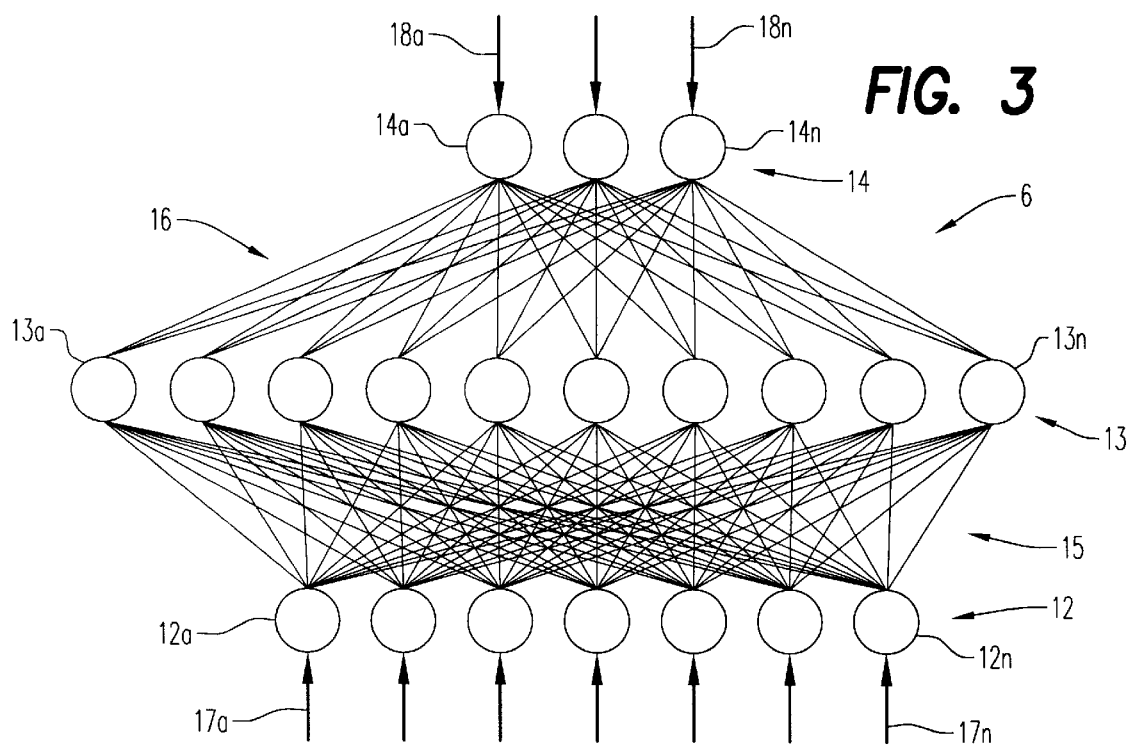

FIG. 3 shows, in a schematic representation, a structure of a model as is designated by the reference symbol 4 in FIGS. 1 and 2. The model 6 consists of individual equations or elements 12a to 12n, which are at least approximately mutually identical, of a first layer 12, of exactly the same elements 13a to 13n of a second layer 13 and of elements 14a to 14n of a further layer 14. In this case, all the elements of the first layer 12 are connected via connections 15 to all the elements of the second layer 13 and these are in turn connected to all the elements of the further layer 14 via connections 16. The elements 12a to 12n of the first layer 12 have inputs 17a to 17n for a group of material data 1 of an input product and for configuration and setting data of a spinning machine. The elements 14a to 14n of the further layer 14 have inputs 18a to 18n for a group of material data 2. All these elements 12a to 12n, 13a to 13n and 14a to 14n, if the model 6 is operating in the learning mode, receive coefficients which weight the data in the connections 15 and 16.

Figure 4:
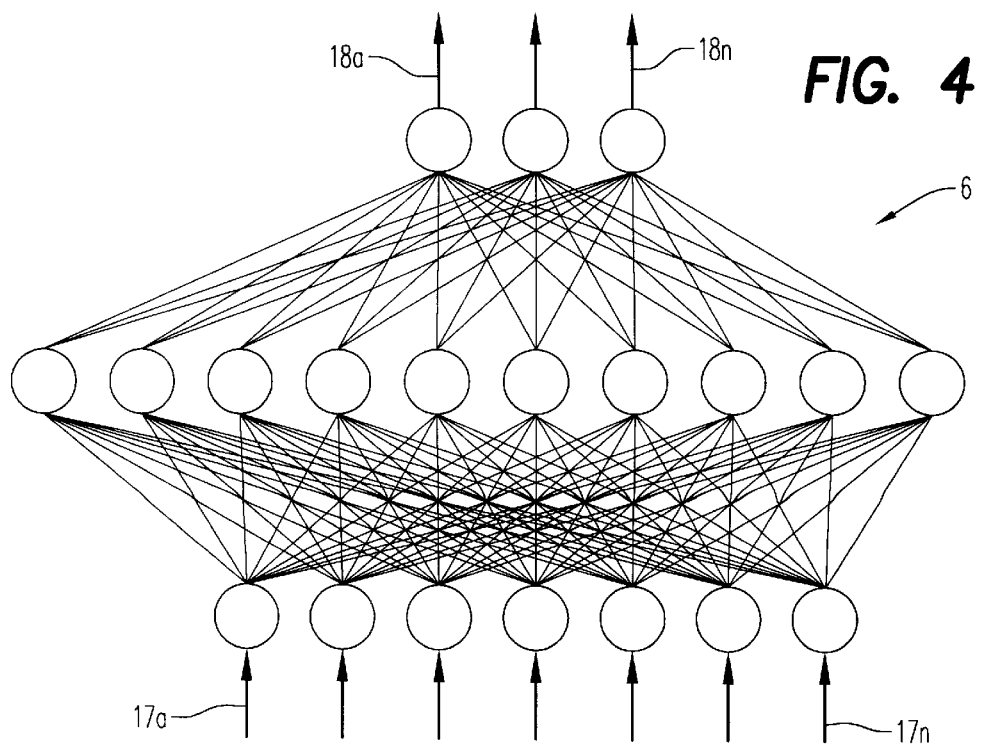

FIG. 4 shows the model according to FIG. 3 when it is operating in the prognosis mode. As a rule, this consists in outputting output values for material data 2 of an output product, via outputs 18a to 18n, proceeding from input values 1 for material data and configuration and setting data 3, which are entered via the inputs 17a to 17n. Consequently, depending on the mode of operation of the model, in one case inputs and in the other case outputs for data are designated by 18a to 18n.

The models or model structures shown in FIGS. 3 and 4 are known to experts as so-called neural networks and are known, for example, from R. Lippmann "An Introduction to Computing with Neural Nets", IEEE, Acoustics, Speech and Signal Processing Magazine, April 1987, pages 4–22.

Figure 5:
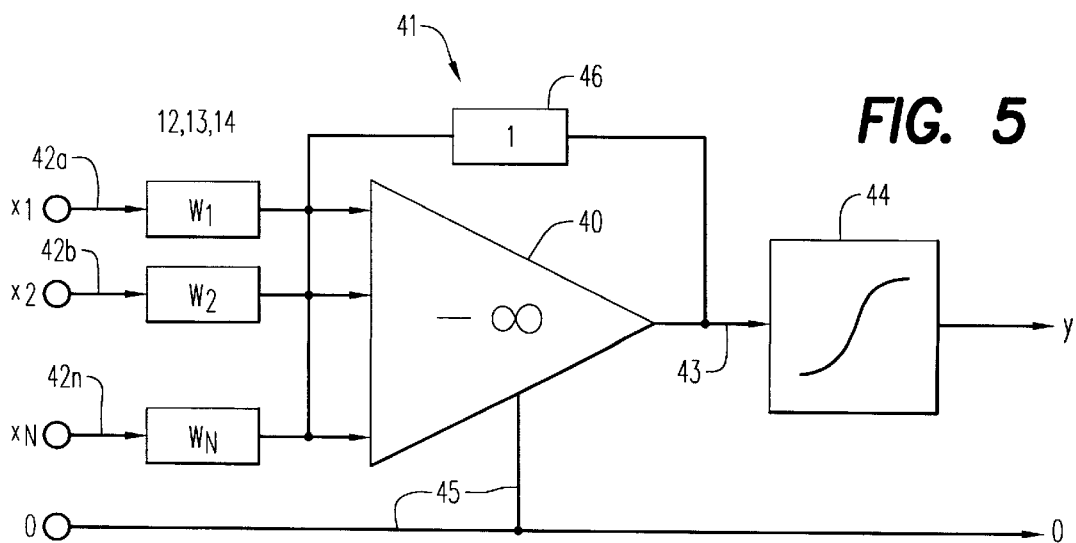
FIG. 5 shows an embodiment of one element of the structure.

FIG. 5 shows, by way of example, the construction of an equation or of an element 12, 13 or 14 from FIGS. 3 and 4, as it could be implemented using traditional electronics. In this case, such an element consists of an operational amplifier 40 with feedback 41. The operational amplifier 40 has one or more inputs 42a to 42n and one output 43 which goes into an element 44, connected downstream, which can be designed as a filter, distorter or limiter, etc. The operational amplifier 40 is also connected to a feed line 45. The gain is determined by the resistance 46 of the feedback 41 as well as by bias resistors W1, W2, Wn, etc., which are assigned to the individual inputs 42a,42b . . . 42n. These bias resistors W1 to Wn are adjustable, so that the gain of the element 12, 13, 14 can hence be set in relation to the individual inputs. The setting of the gain corresponds here to that which was previously designated as setting the coefficients. The bias resistors can be connected for this purpose, for example, to a computer or to a coefficient generator, by means of which these bias resistors W1, Wn can also be set individually by means of automatic entry of values.

Figure 6:
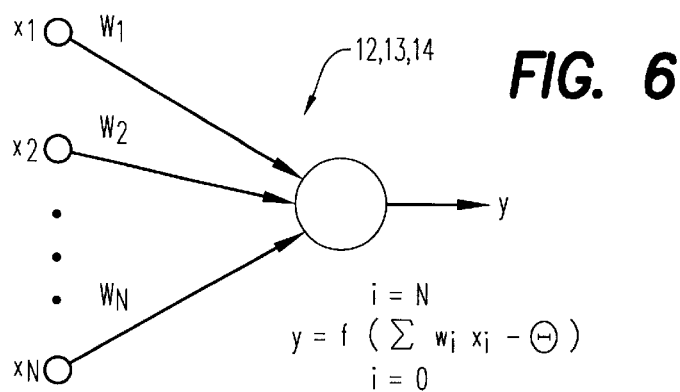
FIG. 6 shows the same structure, in schematic form once more, FIGS. 7, 8 and 9 each show a transfer function.

FIG. 6 shows an element 12, 13, 14, once more in a schematic representation, with the formula for its transfer function. In the figure, the input values are designated by x, the values of the bias resistors or the coefficients by W and a constant by θ theta.

Figure 7:
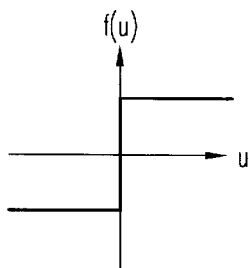
Figure 8:
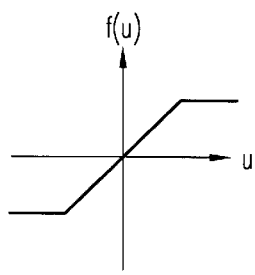
Figure 9:
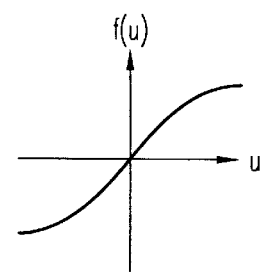

FIGS. 7, 8 and 9 in each case show a typical example of a transfer function which could be implemented by means of a limiter 44, the input values being designated by u and the output values being designated by f (u).

The structure, shown in FIGS. 3 to 6, having the elements does not need to be constructed from discrete elements in the manner shown. It can equally well be implemented by means of a computer whose program simulates such a construction in terms of its function.

Figure 10:
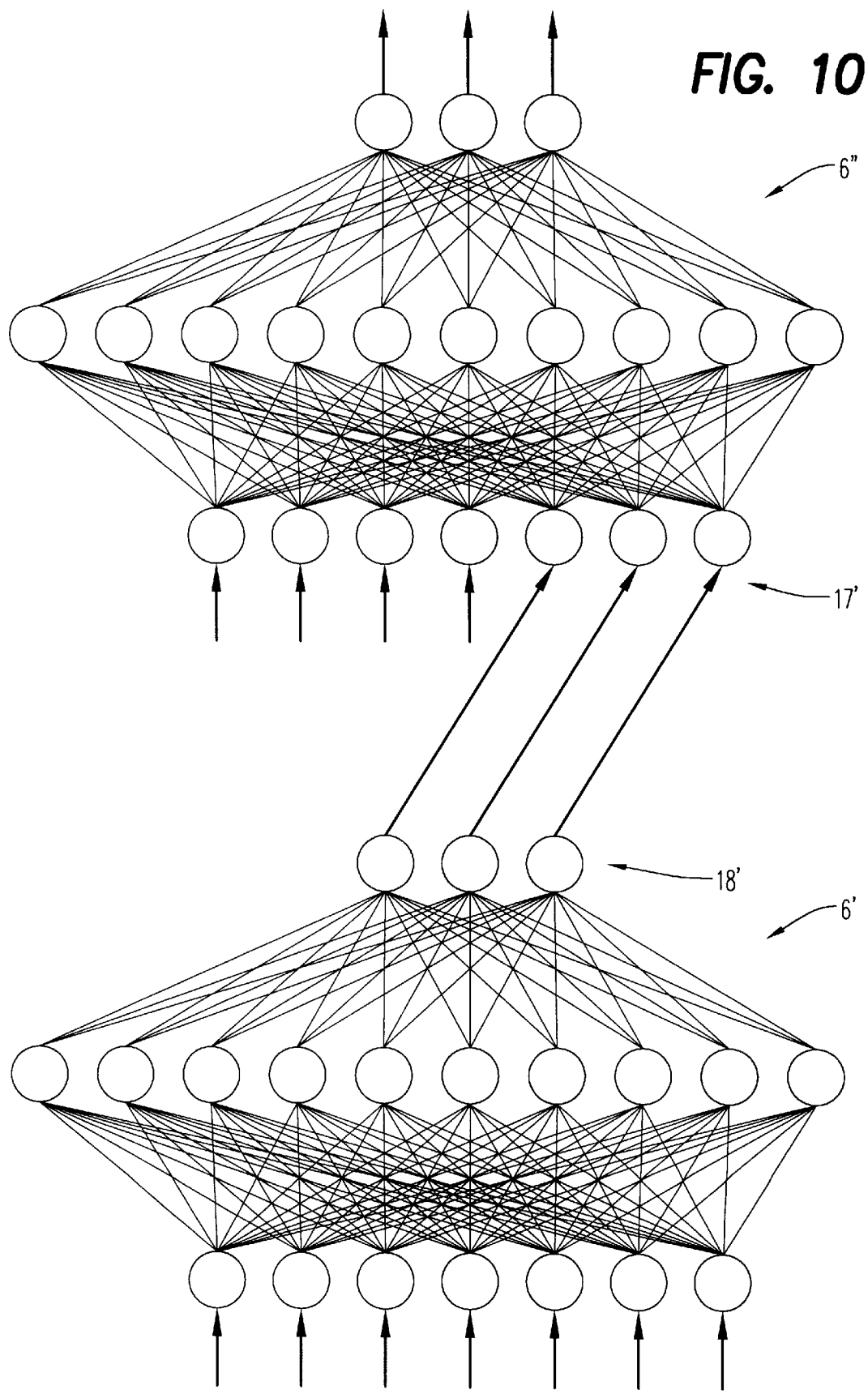
FIG. 10 shows a combined structure of a process model, FIGS. 11 and 12 each show a diagram of a device for the processing of products and a device for obtaining data.

FIG. 10 shows schematically once more a process model 6' of a first spinning machine and a process model 6" of a further spinning machine which are formed independently of each other in a manner now known. Subsequently, the process models can be connected to each other, in that at least some of the output data 18' from the first process model 6' are used as input data 17' of the further process model 6", each process model being fed its own data about the configuration and the setting parameters.

The method according to the invention, which makes use of the advantages of the said networks for specific problems in the processing of input products to make intermediate products or to make textile structures, can be represented in the further figures described below.

Figure 11:
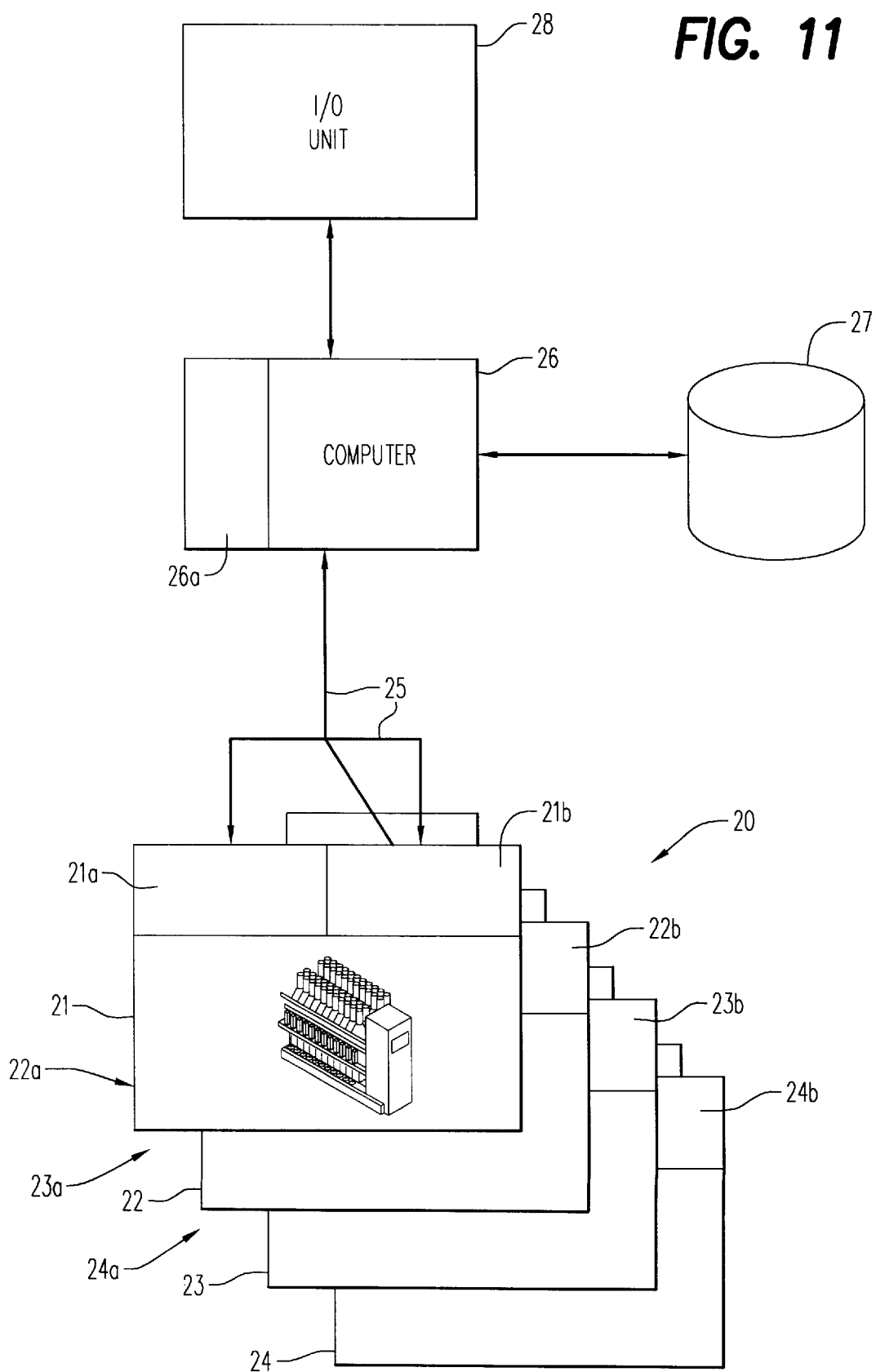

FIG. 11 shows, schematically, known processing 20 such as occurs, for example, on carding machines, spinning frames, etc. A plurality of processing operations occur here in parallel, so that a plurality of machines 21, 22, 23, 24, etc., arranged in parallel, are shown schematically, all of which have a control unit 21a, 22a, 23a, 24a, etc. and a device 21b, 22b, 23b, 24b for reporting back data. The control units 21a to 24a are in particular designed for carrying out control commands which they can obtain from a computer 26 or a database 27. The devices 21b to 24b are, for example, designed as sensors which report the setting and state values of the machines 21 to 24. They can, for example, be rotary speed meters, pressure sensors, etc. with their evaluation circuits. Machines in this sense are to be understood, for example, as carding machines, ring spinning frames, rotor spinning frames, etc. or just generally spinning machines which all have their own control unit and device for monitoring or reporting back data for various parameters. All these machines 21 to 24 are connected to each other and additionally to a computer 26 as a processing unit via a field bus 25, the computer in turn being connected to a data memory with a database 27 stored therein and to an input and output unit 28 for data. The processing unit is designed as a computer 26 with associated program memory 26a and is used to receive data from the machines 21, etc. or to output data to the latter. This processing unit can in particular also be used or designed to collect input variables, output variables and setting variables from the individual machines and to bring into relationship with one another and to store corresponding data sets in the database 27.

Figure 12:
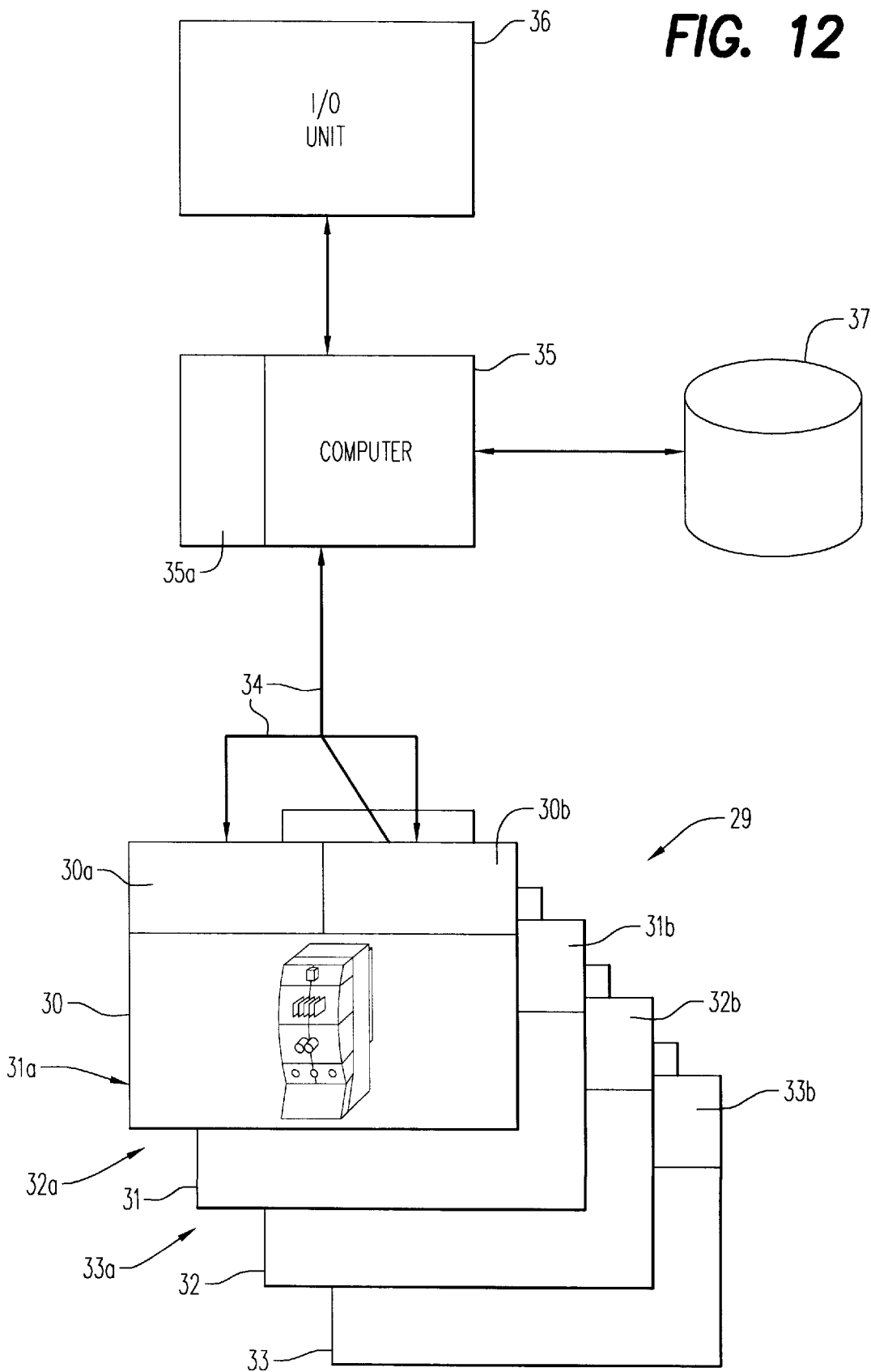

An arrangement which is comparable to that shown in FIG. 11 for a production process is found in FIG. 12 for a textile testing laboratory. In the testing laboratory, various tests 29 can be carried out. A first testing instrument 30 is, for example, designed for testing the cross-section and mass of yarns. A second testing instrument 31 is, for example, designed for testing nonwovens or ribbons. A third testing instrument 32 is designed for the measurement of various variables on individual fibres. A further testing instrument 33 is, for example, designed for testing the tearing strength of yarns, etc. All the testing instruments 30 to 33 have their own control unit 30a to 33a and their own data memory 30b to 33b. The control units 30a to 33a emit, for example, control commands in the sense of commissions to the actual testing instruments 30a to 33a. The data memories 30b to 33b have, for example, stored measurement results. Via the control units and the data memories, the testing instruments 30 to 33 are connected to a common field bus 34 which is in turn connected to a processing unit 35. The latter is constructed as a computer with a program memory 35a. As is already known, this is also connected to an input and output unit 36 and to a data memory with a database 37 stored therein. It is possible to provide an individual and common processing unit 26 or 35 for one or more spinning machines 21 to 24 and, separated physically therefrom, measuring devices or testing instruments 30 to 33. However, it is also conceivable to allocate to each spinning machine 21 to 24 a computer which, for example, can be a part of the control unit 21a to 24a and can operate in the above mentioned sense in the sense of a processing unit. Then, the field bus 25 operates as means for shifting the data between these computers. The databases 27 and/or 37 have an area with stored coefficients which can be fed to the computer 26 and/or 35 and can thus construct the model structure, stored in the program memory 26a, 35a, to form the process model. Even if the testing instruments 30 to 33 could each be provided with their own computer, it is still practical to provide a common computer 3.5, as shown in FIG. 12. This is because the construction of a coefficient matrix according to the back-propagation method requires a high computational complexity which exceeds the capabilities of an individual computer such as is allocated to a testing instrument.

Between a textile testing laboratory, which can be constructed as shown in FIG. 12, and a production process or a production installation, which can be constructed, for example, as shown in FIG. 11, there exists the relationship described below and hence the interactions which are described below are also possible.

The testing laboratory is sent samples which originate from the production process. The samples are taken before, between and at the end of the individual processing operations or machines. By means of testing the samples, success in the individual processing operations can be measured in the testing laboratory. By means of the interlinking of the individual testing instruments 30, 31, 32, 33, etc. via the field bus 34 and the processing unit 35, for each processing operation or machine 21, 22, 23, 24, etc., input data and output data of the material can be acquired from the corresponding tests and stored in the database 37. As a result of the corresponding interlinking of the machines 21, 22, 23, 24, etc. via the field bus 25, the configuration and setting data of the relevant machines 21, 22, 23, 24, etc. can be stored in the database 27 via the processing unit 26. Thus, all the data for the construction of a model can be collected and can be stored in order, so that these can be called up. By means of suitable joining together of the relevant data from the two databases 27 and 37, it can be ensured that the correct data are also combined. This is shown by the representation in FIG. 13. This is, for example, because the field bus 25 of the spinning machines 21 to 24 and the field bus 34 of the testing instruments 30 to 33 are defined identically and are connected to each other.

Figure 13:
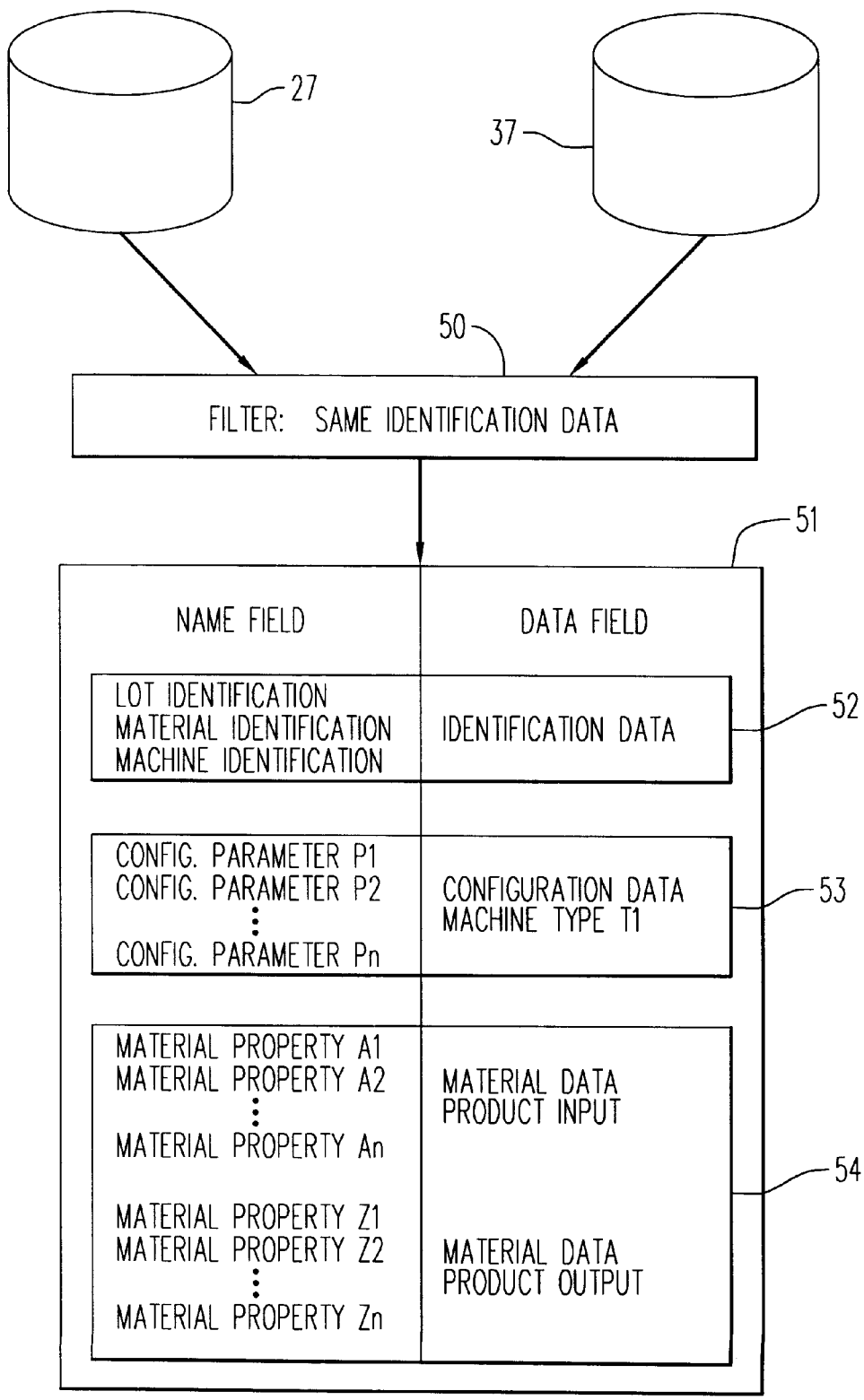
FIG. 13 shows schematically a part of the obtaining of data.

FIG. 13 shows in particular in a schematic representation the two databases 27 and 37, which are connected to a filter 50 which is implemented in software terms in the sense that the content of both databases 27 and 37 can be fed to this filter at least from time to time. In the filter 50 it is ensured that the material input and output data which correspond to one another are combined with the corresponding data of that machine or processing operation which has been brought about by the change, which can be read out from the output data, on the material having the input data.

For example, output data which relate to the yarn fineness and the yarn uniformity are to be related to setting data of a spinning frame and to input data of a nonwoven or ribbon. In order that this occurs, various data must be combined, which are listed, for example, in field 51. This is subdivided into a field 52 for identification data, a field 53 for machine or configuration data and a field 54 for material data. Accordingly, from the database 27, the data must be retrieved from the fields 52 and 53 and, from the database 37, the data must be retrieved from the fields 52 and 54. This takes place, for example, in one of the processing units 26 or 35, which have a filter 50 which can combine the configuration data and the material data using the identification data. This combination is known per se in database technology and is, for example in the case of so-called "relational database systems", triggered by means of the so-called "join command".

Figure 14:
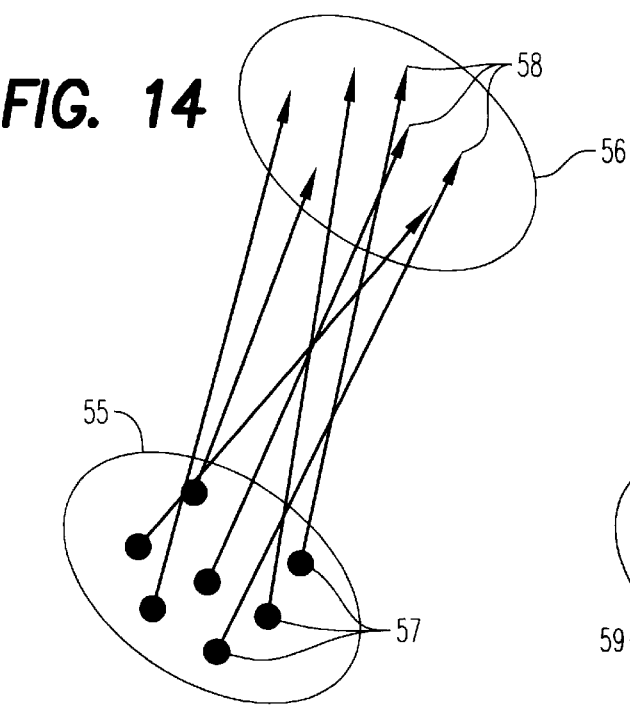
FIGS. 14, 15, 16 and 17 show schematically possible situations in the obtaining of data.
Figure 15:
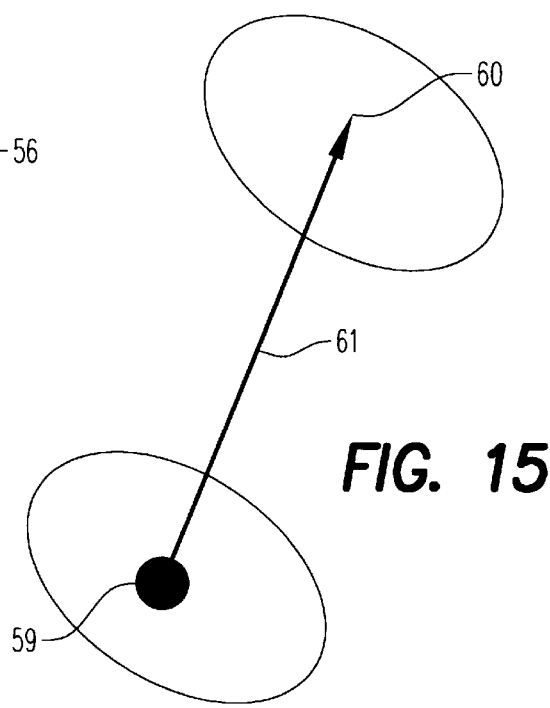

The model 6 (FIGS. 3 and 4) is all the better and more universally applicable if material and configuration data which are as different as possible and determined experimentally as completely as possible as a whole have been taken into account in forming the model. If these data are obtained from running production, it can occur that stored data are available only in a narrow area. Such areas 55 and 56 are shown in FIG. 14 for input data 57 and output data 58. In such cases it can be advantageous to determine data derived therefrom, for example by averaging the input data to form an average value 59 and the output data to form an average value 60, as is shown in FIG. 15. This is especially practical when the input data and the output data do not agree exactly only because of statistical fluctuations. If this is the case, the model formation can be carried out in an accelerated manner since only one data set is present in each case. This is indicated by a single arrow 61.

Figure 16:
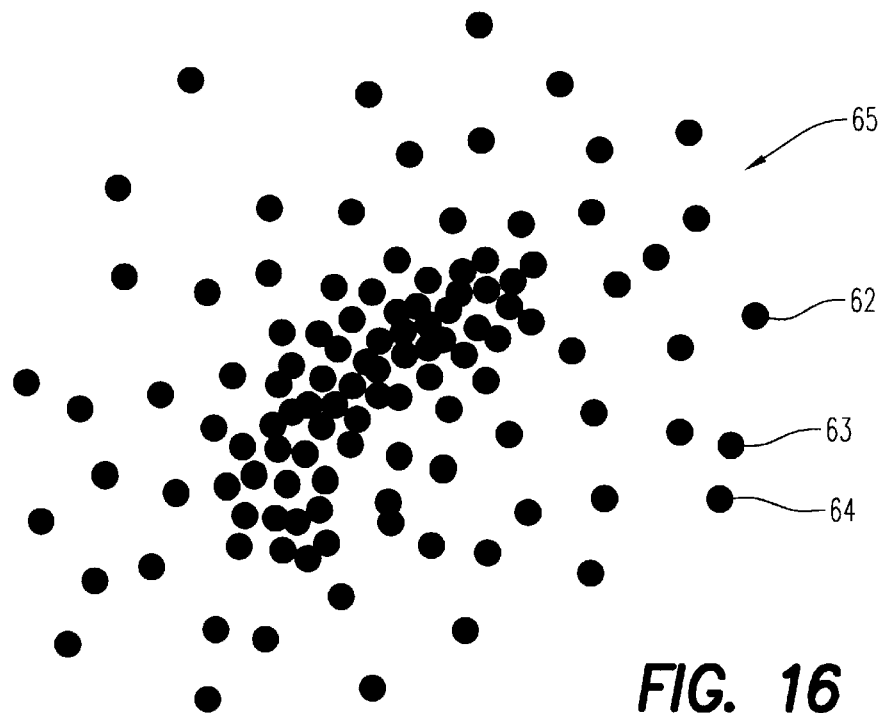
Figure 17:
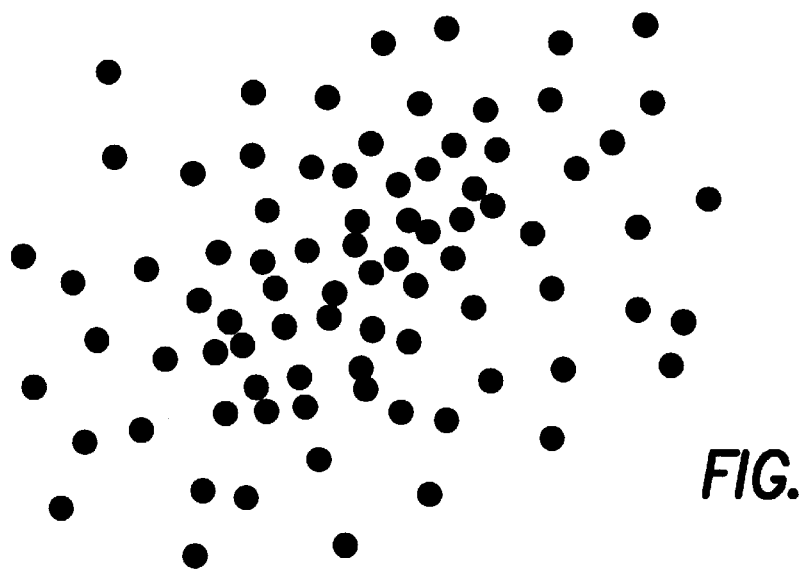

If there are data sets, as they are shown in FIG. 16, where each point 62, 63, 64, etc. represents a data set or a group of data sets, the above mentioned averaging for areas 65 or portions of these areas can be advantageous where data occur in large numbers. This then leads to a diluted data set, as is shown in FIG. 17.

Figure 18:
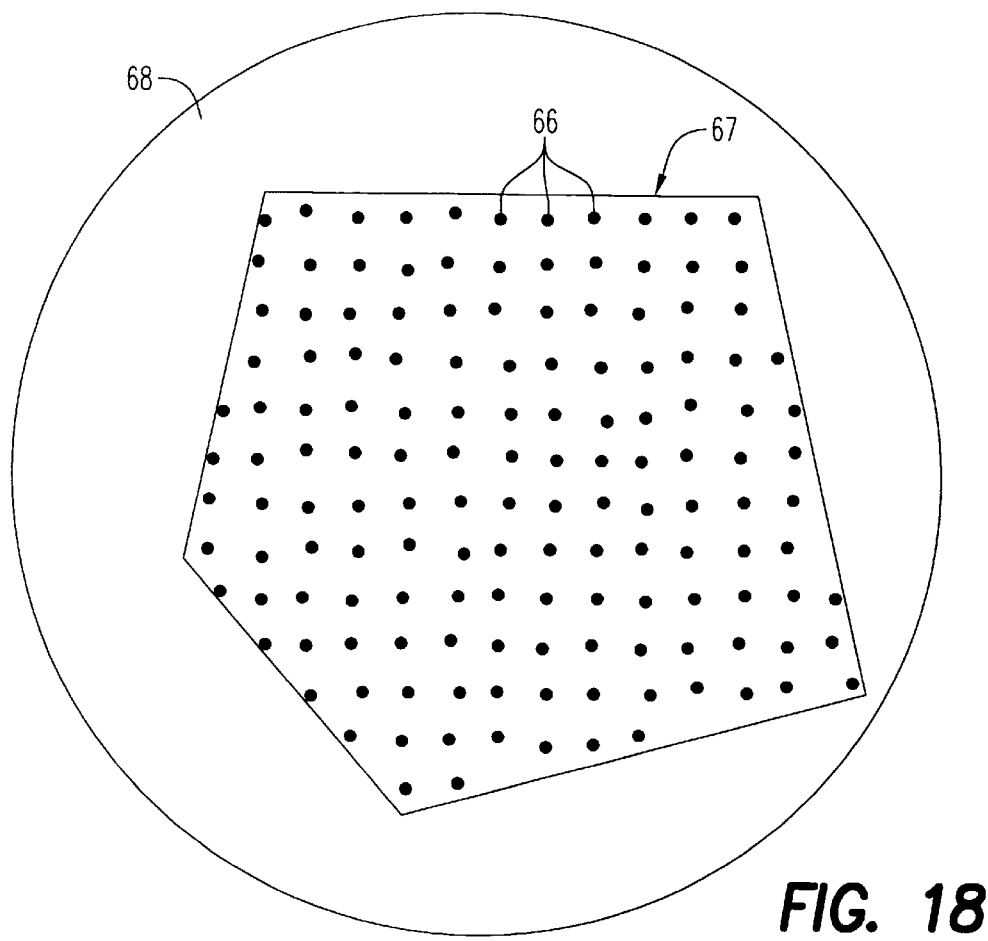
FIGS. 18 and 19 show various distributions of the data occurring.

The experience which is brought into the model via the data can be very diverse. It can extend over a large area of material data and configuration and setting data, as is indicated in FIG. 18 by points 66 in an area 67. Furthermore, there will always be an area 68 outside the area 67 for which the experience of the model is not valid, since it is not supported by any experience, simply because no data were yet available.

Figure 19:
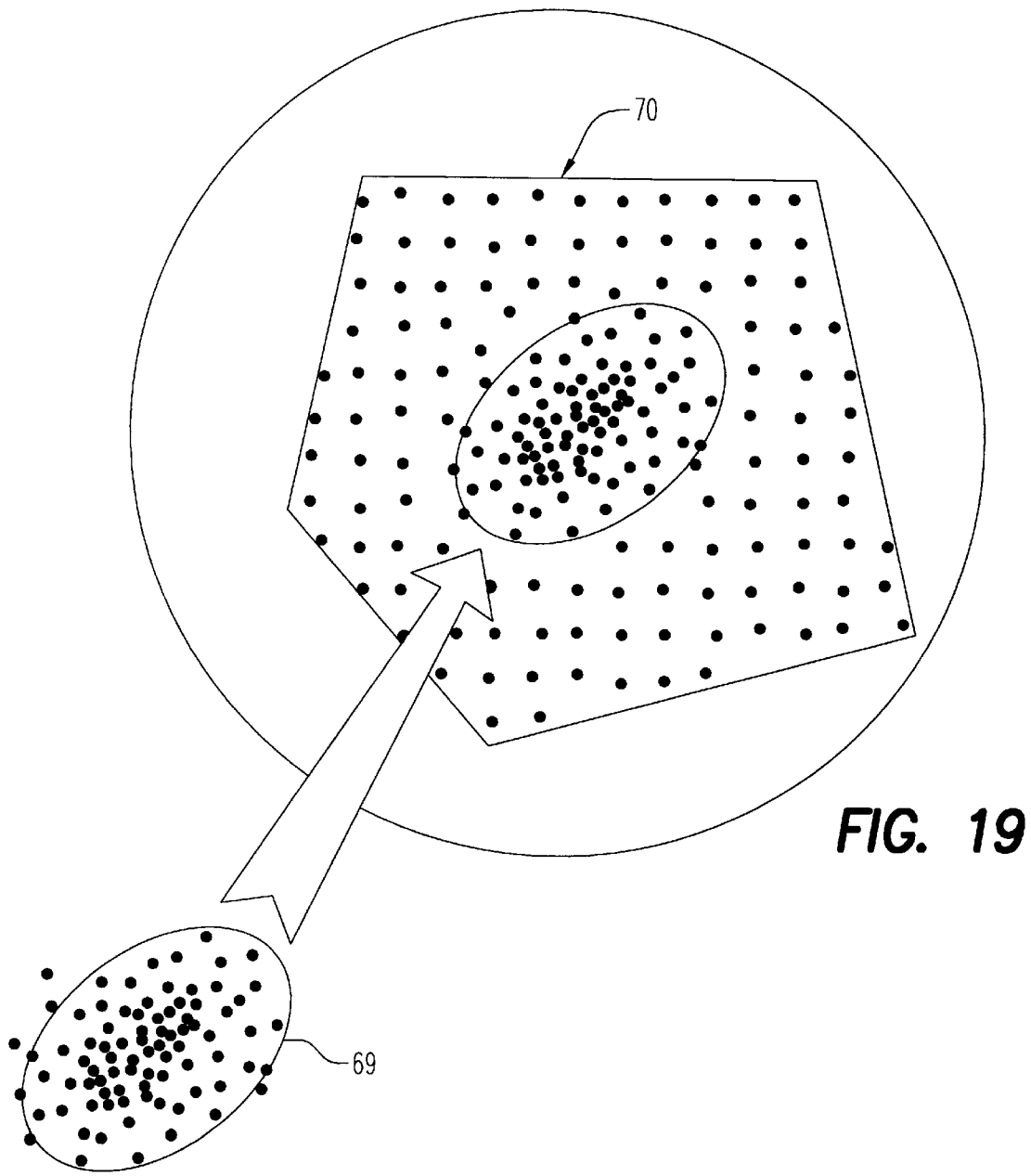

As is shown by FIG. 19, however, there can also be a partial area 69 with particularly great experience within an area 70 of average experience. This means that the process model is formed proceeding from data from a partial area 69 of the area 70. This can, for example, also mean that the greater experience was introduced into the area 70 later.

Using the method mentioned above and just described, many possibilities for its advantageous utilization and many implementations for this purpose are possible. In particular it is thus possible, proceeding from material data which are present or partly also sought after, to determine configuration and setting data, or to determine in advance some of the missing material data, using given configuration and setting data. However, a precondition for this is that the model has already been constructed. Thus, for example, it is conceivable to assign such a model to a production machine, from which model the inexperienced operator of the machine can immediately derive configuration values which allow him to produce a desired output material from a prescribed input material, or simply to determine that it is impossible. However, a skilful operator of the machine can, for example, for an area 69 in which he has particularly great experience, improve the model or refine the model in order to be able to make still more precise predictions. In any case, using such models, inexperienced people can be helped to influence a production process in a favorable manner. Hence the capability is given to experienced people of extending their experience.

What is claimed is:

1. A method for simulating the processing of input products in a spinning machine by means of a process model of nonlinear equations that is embodied in a neural network, comprising the steps of training the neural network by inputting data relating to (i) said input products, (ii) output products produced by said processing, and (iii) configuration parameters of the processing operation carried out in the spinning machine, and operating the trained neural network to produce estimates of the operation of the spinning machine.

2. The method of claim 1 wherein during said operating step first and second groups of data are input to the neural network and a third group of data is determined therefrom, wherein said three groups of data are respectively formed by one of (a) data relating to input products, (b) data relating to output products, and (c) data relating to configuration parameters of the spinning machine.

3. The method of claim 2 further including the step of repeatedly modifying data from at least one of said first and second groups to determine said third group of data.

4. The method of claim 2 wherein said third group of data comprises data relating to configuration parameters of the spinning machine, and further including the step of setting parameters of the spinning machine in accordance with said third group of data.

5. The method of claim 1 wherein said input data includes data determined by experimental measurements and data derived from said measurement data.

6. The method of claim 5 wherein the input data is contained within a partial range of an entire range of measurement data.

7. The method of claim 1 further including the step of identifying specific data relating to input products and output products as being associated with particular input products and output products, respectively, and associating specific configuration parameters with particular output products processed by the spinning machine.

8. The method of claim 7 wherein the data is obtained by measuring the input and output products with measuring devices that are independent of and physically separate from the spinning machine.

9. The method of claim 1 further comprising the steps of forming first and second process models that respectively pertain to first and second spinning machines, and providing output data from said first process model as input data to said second process model.

10. A device for simulating the processing of products in a spinning machine, comprising:

means associated with the spinning machine for producing data relating to the operation of the spinning machine;

a computer having a data input/output unit; means for transmitting data between said data producing devices and said computer;

a program memory in said computer storing data pertaining to a model structure that is embodied in a neural network; and a database containing data relating input products processed by the spinning machine, output products produced by the spinning machine, and configuration parameters for the spinning machine, for input to said neural network.

11. The device of claim 10 further including measuring devices that are physically separate from said spinning machine for generating data that is contained in said database.

12. The device of claim 11 further including a second computer and means for transmitting data from said measuring devices to said second computer, and wherein each of said transmitting means comprises a field bus, and said field busses are connected to one another.

13. A method for simulating the operation of a spinning machine, comprising the steps of:

training a neural network with input data relating to (i) input products that are processed by spinning machines, (ii) operating parameters of spinning machines, and (iii) output products produced by spinning machines, to thereby define coefficients for a simulation model; and subsequently operating the training neural network using at least two of said three types of data (i), (ii) and (iii) as input data and said model coefficients to produce output data which describes the simulated operation of a spinning machine.

14. The method of claim 13 wherein said output data comprises the third type of data (i), (ii) or (iii).

15. The method of claim 14 wherein said input data that is used in the operation of the trained neural network comprises data relating to (i) input products that are processed by spinning machines, and (ii) operating parameters of spinning machines, and said output data comprises data relating to (iii) output products produced by spinning machines.

16. The method of claim 14 wherein said input data that is used in the operation of the trained neural network comprises data relating to (i) input products that are processed by spinning machines, (iii) output products produced by spinning machines, and said output data comprises data relating to (ii) operating parameters of spinning machines.

17. The method of claim 13 comprising the steps of training a neural network with one set of input data to define coefficients for a first simulation model, training a neural network with a different set of input data to define coefficients for a second simulation model, operating a neural network in accordance with the coefficients for the first simulation model to produce output data, and operating a neural network in accordance with the coefficients for the second model, using at least some of the output data produced by the first simulation model as input data, to produce further output data.

* * * * *